(12) United States Patent
Ohler et al.

(10) Patent No.: US 6,314,367 B1
(45) Date of Patent: Nov. 6, 2001

(54) NAVIGATION SYSTEM WITH FEATURE FOR REPORTING ERRORS

(75) Inventors: Jean Ohler, Bloomingdale; Mark Barton, Schaumburg; Roy Casino, Mundelein; Lawrence M. Kaplan, Northbrook, all of IL (US)

(73) Assignee: Navigation Technologies Corporation, Chicago, IL (US)

( * ) Notice: Subject to any disclaimer, the term of this patent is extended or adjusted under 35 U.S.C. 154(b) by 0 days.

(21) Appl. No.: 09/888,928

(22) Filed: Jun. 25, 2001

Related U.S. Application Data

(63) Continuation of application No. 09/602,127, filed on Jun. 23, 2000, now Pat. No. 6,253,151.

(51) Int. Cl.[7] .................................................. G01C 21/26
(52) U.S. Cl. .......................... 701/208; 701/210; 701/211; 340/990; 340/995
(58) Field of Search ..................................... 701/208, 210, 701/211, 214; 340/990, 995; 455/457; 707/10; 709/301, 302

(56) References Cited

U.S. PATENT DOCUMENTS 5,712,899 * 1/1998 Pace, II ................................. 379/58
5,751,245 * 5/1998 Janky et al. ......................... 342/357

* cited by examiner

Primary Examiner—Tan Nguyen
(74) Attorney, Agent, or Firm—Frank J. Kozak; Lawrence M. Kaplan

(57) ABSTRACT

A feature whereby an end user of a navigation system that uses geographic data can easily report perceived errors or inaccuracies in the geographic data or other problems such as poor quality route calculation or guidance. The end user uses a user interface of the navigation system to indicate the perceived error, inaccuracy, or other problem. The navigation system includes a report program that operates in response to the end user's indication. The report program collects information indicating the error, inaccuracy, or other problem and sends a report including the collected information to a geographic database developer. The geographic database developer can use the information in the report to update a geographic database.

20 Claims, 12 Drawing Sheets

NAVIGATION SYSTEM WITH FEATURE FOR REPORTING ERRORS

REFERENCE TO RELATED APPLICATION

The present application is a continuation of U.S. Pat. No. 6,253,151, Ser. No. 09/602,127, filed Jun. 23, 2000.

BACKGROUND OF THE INVENTION

The present invention relates to navigation systems and more particularly the present invention relates to a feature provided by a navigation system that facilitates the reporting by an end user of a perceived error or inaccuracy in the geographic data used by the navigation system or another problem, such as poor quality route calculation or guidance.

Navigation systems provide useful features, such as calculating routes to desired destinations and providing guidance for following the routes. In order to provide these features, navigation systems use geographic data that include information about the locations of roads and intersections, estimated travel times along road segments, the speed limits along roads, etc. Using these kinds of geographic data, programming included in a navigation system can find an optimal (e.g., fastest or shortest) route to a specified destination.

Although navigation systems provide useful features, there still exists room for improvement. One area in which there is room for improvement relates to the collection and updating of geographic data. The collection of geographic data for use in navigation systems is a significant undertaking. The initial collection of data about the roads in a geographic area is a significant task. Beyond the effort involved in collecting geographic data for use in navigation systems, there is a continuing need to update and check the geographic data. Just like conventional printed maps, geographic data used in navigation systems become out-of-date. For example, new roads are built, businesses change locations, road construction closes roads, detours are established, museum and restaurant hours change, etc. Thus, the collection of geographic data for navigation systems is a continuing effort.

One way to collect geographic data is to obtain feedback from end users who have navigation systems. End users who have navigation systems may discover that certain geographic data used in their navigation systems are not correct or accurate. When this occurs, it would be useful to provide a means by which the end user can report the error or inaccuracy to the geographic database developer. Using such reports from end users, the geographic database developer can make corrections to a master copy of the geographic database, which is then used to make new, updated versions of geographic databases for use in navigation systems.

One difficulty with obtaining reports from end users about errors or inaccuracies in the geographic data used by the end users' navigation systems is that many end users may not want to spend the time or effort to make meaningful reports. Another difficulty with obtaining reports from end users about errors or inaccuracies in the geographic data is that reports from various users may be inconsistent in format, detail, style, content, etc. Another difficulty with obtaining reports from end users about errors or inaccuracies in the geographic data is that some reports may be lacking the details that are necessary to enable the database developer to determine the causes of the errors perceived by the end users.

Accordingly, there exists a need for an improved way to obtain end user feedback about perceived errors in geographic data used in navigation systems.

SUMMARY OF THE INVENTION

To address these and other objectives, the present invention comprises a feature whereby an end user of a navigation system that uses geographic data can easily report perceived errors or inaccuracies in the geographic data or other problems such as poor quality route calculation or guidance. The end user uses a user interface of the navigation system to indicate the perceived error, inaccuracy, or other problem. The navigation system includes a report program that operates in response to the end user's indication. The report program collects information indicating the error, inaccuracy, or other problem and sends a report including the collected information to a geographic database developer. The geographic database developer can use the information in the report to update a geographic database.

DETAILED DESCRIPTION OF THE PRESENTLY PREFERRED EMBODIMENTS

I. EXEMPLARY NAVIGATION SYSTEM PLATFORM

A. Overview

Figure 1:
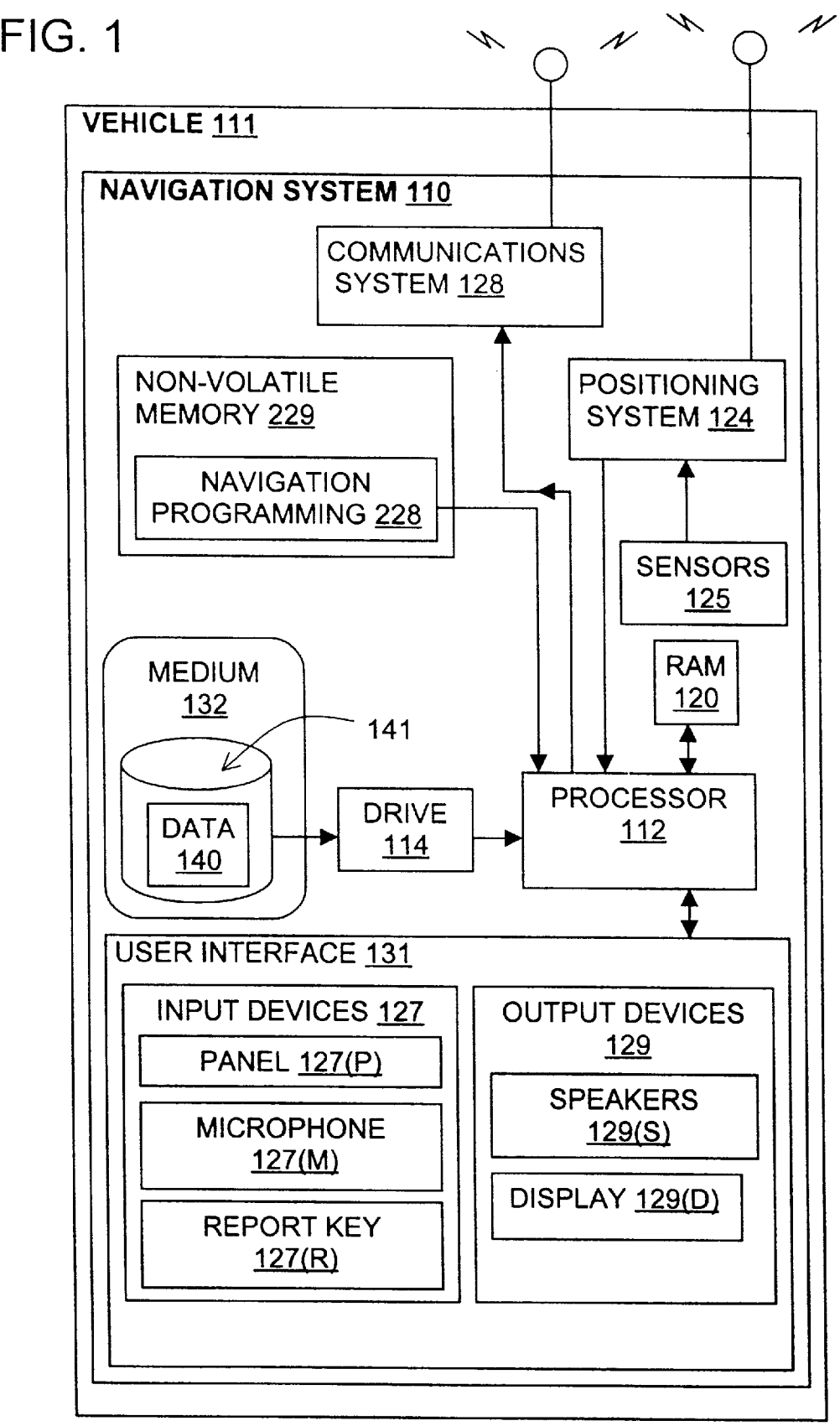
FIG. 1 is a block diagram illustrating a navigation system.

Referring to FIG. 1, there is a diagram illustrating an exemplary embodiment of a navigation system 110. In the embodiment shown in FIG. 1, the navigation system 110 is located in a vehicle 111, such as an automobile, truck, or bus. The navigation system 110 is a combination of hardware and software components. The hardware components of the navigation system 110 may include a processor 112, memory 120, and so on. In the embodiment of FIG. 1, the navigation system 110 also includes a positioning system 124 that determines the position of the vehicle 111 in which it is installed. The positioning system 124 may include sensors 125 or other components that sense the speed, orientation, direction, angular acceleration, and so on, of the vehicle 111. The positioning system 124 may also include a GPS system.

The navigation system 110 also includes a user interface 131. The user interface 131 includes appropriate means 127 for receiving input from an end user of the navigation system. The input receiving means 127 may include a keyboard, keypad, or other type of input panel 127(P), a microphone 127(M), as well as other means for accepting end-user input, such as voice recognition software, and so on, through which the end user may request navigation information and services. The user interface 131 also includes appropriate means 129 for providing information back to the end user. The information providing means 129 may include a display 129(D) and speakers 129(S) (including speech synthesis hardware and software) through which the end user can be provided with information and services from the navigation system 110.

The navigation system 110 also includes a communications system 128. The communications system 128 includes the appropriate hardware and software to send and receive data messages wirelessly. The communications system 128 may be implemented using any available technology for transmitting messages. The communications systems 128 is operatively coupled to other components of the navigation system 110 so that messages can be sent from and received by the navigation system, as explained in more detail below.

Figure 2:
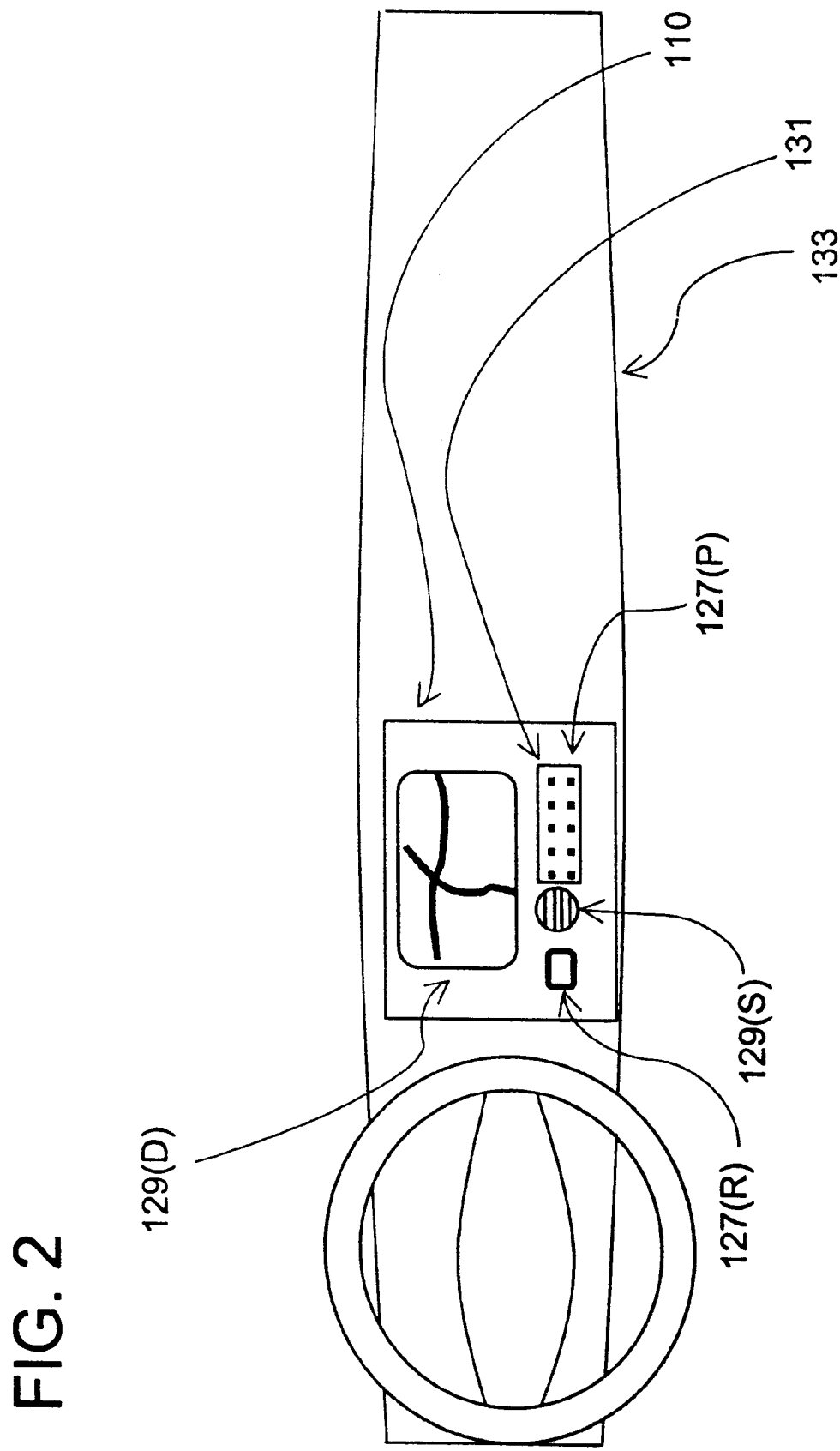
FIG. 2 is an illustration of the navigation system of FIG. 1 installed in a dashboard.

FIG. 2 shows components of the user interface 131. In FIG. 2, the navigation system 110 is installed in a dashboard 133 of the vehicle 111. The components of the user interface 131, including the display 129(D), speaker 129(S); and input panel keypad 127(P), are shown installed in a front panel of the navigation system 110.

All of the components described above may be conventional (or other than conventional) and the manufacture and use of these components are known to those of skill in the art.

Referring again to FIG. 1, the user interface input means 127 includes an error report key or button 127(R). As shown in FIG. 2, the report key or button 127(R) is shown installed on the front panel of the navigation system 110. The function of the report key 127(R) is explained below.

B. The geographic database

Referring again to FIG. 1, in order to provide navigation features to an end user, the navigation system 110 uses geographic data 140. The geographic data 140 include information about one or more geographic regions or coverage areas. The geographic data 140 may be stored in the vehicle 111 or alternatively, the geographic data 140 may be stored remotely and made available to the navigation system 110 in the vehicle 111 through the wireless communication system 128 which may be part of the navigation system 110. In another alternative, a portion of the geographic data 140 may be stored in the vehicle 111 and a portion of the geographic data 140 may be stored in a remote location and made available to the navigation system 110 in the vehicle 111 over the wireless communication system 128 from the remote location.

In the embodiment shown in FIG. 1, some or all of the geographic data 140 are stored on a medium 132 which is located in the vehicle 111. Accordingly, the navigation system 110 includes a drive 114 (or other suitable peripheral device) into which the medium 132 can be installed and accessed. In one embodiment, the storage medium 132 is a CD-ROM disk. In another alternative embodiment, the storage medium 132 may be a PCMCIA card in which case the drive 114 would be substituted with a PCMCIA slot. Various other storage media may be used, including fixed or hard disks, DVD disks or other currently available storage media, as well as storage media that may be developed in the future.

The geographic data 140 include data specifying the positions of the roads in the covered geographic region(s). The geographic data 140 also include data relating to the roads, such as restrictions on directions of travel along the roads (e.g., one-way streets), street addresses along the roads, street names, speed limits along the roads, turn restrictions at intersections, and so on. The geographic data 140 may also include information about points of interest in the geographic area, such as hotels, restaurants, museums, stadiums, offices, automobile dealerships, auto repair shops, etc. The geographic data 140 may also include information about places, such as cities, towns, or other communities. The geographic data 140 may include other kinds of data about the geographic area.

The geographic data 140 may take a variety of different forms. In one embodiment, the geographic data 140 are in the form of one or more computer-readable data files or databases 141. Methods for forming and organizing a geographic database are disclosed in U.S. Pat. Nos. 5,953,722, 5,974,419 and 5,968,109, the disclosures of which are incorporated herein by reference. In one embodiment, the geographic database 141 contains a plurality of road segment data records. Each road segment data record represents a portion (or segment) of a navigable road in the geographic region. In one type of geographic database, there is at least one database entry (also referred to as "entity" or "record") for each represented road segment in a geographic region. A road segment data record may include a segment ID by which the record can be identified in the geographic database. Data attributes are associated with each road segment data record to describe features or characteristics of the represented road segment. The road segment data record may include attributes representing the speed limit along the road (or a speed limit range), the type of road (e.g., controlled access, ramp, bridge, tunnel, toll road, ferry, and so on), a functional rank, a permitted direction of travel, an address range, a name, a highway designation of the road of which the road segment is a part, and so on. The various attributes associated with a road segment may be included in a single road segment record, or may be included in more than one type of record that are cross-referenced to each other.

Each physical road segment has two nodes associated with it, one at each of the endpoints of the road segment. In one embodiment, the geographic database 141 includes a plurality of data entities that represent these nodes. In one embodiment, each road segment data record includes data references to the node data records that represent the endpoints of the represented road segment.

(The terms "segment" and "node" represent only one terminology for describing these physical geographic features and other terminology for these features is intended to be encompassed within the scope of these concepts.)

In one embodiment, the geographic data are provided by Navigation Technologies Corporation of Rosemont, Illinois. However, it is understood that the inventive concepts disclosed herein are not restricted to any particular source of data.

C. The navigation programming.

As shown in FIG. 1, the navigation system 110 includes or uses navigation programming 228. The navigation programming 228 includes the software that provides for the functions and/or features performed by the navigation system 110. The navigation programming 228 uses the geographic data 140 in conjunction with input from the end user via the user interface 131, and possibly in conjunction with outputs from the positioning system 124, to provide various navigation-related features and/or functions.

The navigation programming 228 may be stored in a non-volatile storage medium 229 in the navigation system 110. Alternatively, the navigation programming 228 and the geographic data 140 may be stored together on a single storage device or medium. Alternatively, the navigation programming 228 may be located at a remote location and may be provided to or accessed by the navigation system 110 over a communications system.

In one embodiment, the navigation programming 228 is written in the C programming language although in alternative embodiments other programming languages may be used, such as C++, Java, Visual Basic, and so on.

Figure 3:
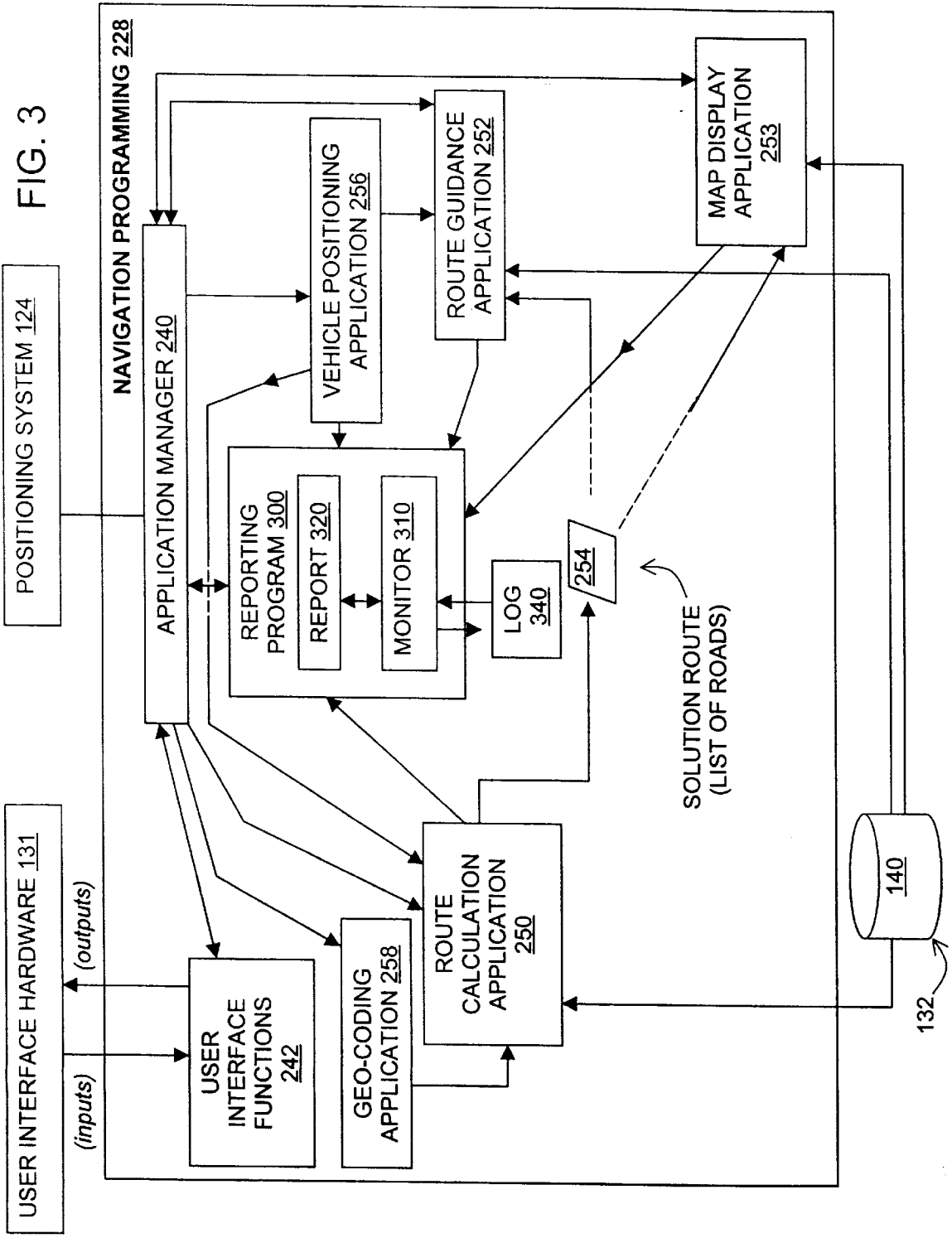
FIG. 3 is a block diagram illustrating components of the navigation programming shown in FIG. 1 including an error reporting program.

The navigation programming 228 may be formed of separate component applications (also referred to as programs, subprograms, routines, or tools). The component applications of the navigation programming 228 work together through defined programming interfaces. FIG. 3 shows a block diagram illustrating some of the component applications for one embodiment of the navigation programming 228 included in the navigation system 110 of FIG. 1. In addition to the component programs shown in FIG. 3, the navigation programming 228 may include other component sub-routines or programs.

In FIG. 3, the navigation programming 228 is shown to include a navigation application manager 240. The navigation application manager 240 is a program or routine that provides for overall management of the functions of the navigation system 110. The navigation application manager 240 may also include support for and interfaces with the navigation system hardware, such as the positioning system 124 and the user interface 131. The navigation programming 228 includes user interface functions 242 to interface with the user interface hardware 131. These user interface functions 242 may provide for presenting a menu to the end user on the screen display 129(D) of the user interface hardware 131, accepting inputs from the end user via the input devices 127 of the user interface hardware 131, displaying results to the end user on the screen display 129(D) of the user interface hardware 131, and so on.

The navigation programming 228 includes sub-programs or routines that interface with the navigation application manager 240 and that provide for specific navigation-related features or functions to be performed by the navigation system. These sub-programs include a route calculation application 250, a route guidance application 252, a map display application 253, a vehicle positioning application 256 and a geo-coding application 258. The navigation programming 228 may include other navigation applications in addition to these.

D. Example of operation of the navigation system.

A request for route guidance may originate with input from the end user. The end user identifies a desired destination. The end user may identify the desired destination by street address, location name, cross street, point of interest type, etc. The request is received via the user interface 131. The end user's input is forwarded via the user interface functions 242 and the manager application 240 to the geo-coding application 258. The geo-coding application 258 identifies one or more database records associated with the desired destination. The geo-coding application 258 forwards data indicating the one or more identified database records to the route calculation application 250.

Meanwhile, the vehicle positioning application 256 identifies the database record that represents the road segment upon which the vehicle is currently located. The vehicle positioning application 256 forwards data indicating the identified database record to the route calculation application 250.

Having received data that identify the starting location and the desired destination location, the route calculation application 250 attempts to determine one or more solution routes between the starting location and the destination location. A solution route is formed of a series of connected road segments over which a vehicle can travel from the starting location to the destination location. When the route calculation application 250 calculates a route, it accesses the geographic data 140 and obtains road segment data records that represent road segments around and between the starting location and the destination location. The route calculation application 250 uses the information in the road segment data records to attempt to determine at least one valid solution route from the starting location to the destination location. The route calculation application 250 may use various means or algorithms in determining solution routes. In determining a valid solution route for a vehicle to travel, the route calculation program 250 uses the data attributes associated with the road segment data records to account for direction of travel restrictions (e.g., one-way streets), turn restrictions at intersections (e.g., no left turns), and so on. The route calculation application 250 may attempt to find a solution route that takes the least time to travel, that covers the least distance, or that meets some other criteria.

The route calculation application 250 provides an output. In the embodiment of FIG. 3, the output of the route calculation application 250 is in the form of an ordered list 254 identifying a plurality of road segments. The plurality of road segments form the continuous navigable route between the origin and the destination that had been calculated by the route calculation application 250. (The route calculation application 250 may calculate more than one solution route.)

The list 254 of road segments determined by the route calculation application 250 is provided to the route guidance application 252. The route guidance application 252 uses the information in the list 254, as well as additional information from the geographic database 141, to provide maneuvering instructions and advice to the end user to travel the route defined by the list 254 output by the route calculation application 250.

In order to provide maneuvering instructions at appropriate times and locations, the navigation system 110 uses data from the positioning system 124. The positioning system 124 acquires data used to determine the position of the vehicle as it is traveling. The vehicle positioning application 256 in the navigation programming 228 uses the data from the positioning system 124 to determine the vehicle's location relative to data in the geographic database 141. Based on a comparison of the vehicle's position to the positions of the road segments in the calculated driving route 254, maneuvering instructions are provided at appropriate times or locations.

The output of the route calculation application 250 may also be provided to the map display application 253 so that graphical maps may be displayed as the vehicle is traveling the calculated route.

Methods for route calculation are disclosed in Ser. No. 09/047,698, filed Mar. 25, 1998; methods for providing route guidance are disclosed in Ser. No. 08/893,201, filed Jul. 15, 1997 and Ser. No. 09/196,279, filed Nov. 19, 1998;

methods for providing vehicle positioning are disclosed in Ser. No. 09/276,377, filed Mar. 25, 1999; and methods for providing map display are disclosed in Ser. No. 09/047,141, filed Mar. 24, 1998 and Ser. No. 09/092,625, filed Jun. 5, 1998. The disclosures of these six patent applications are incorporated by reference herein. The methods disclosed in these patent applications represent only some of the ways that these functions can be provided and the subject matter claimed herein is not limited to any particular method. Any suitable method now known or developed in the fixture may be employed.

II. THE REPORTING FEATURE

According to a first embodiment, the navigation system includes a feature that facilitates the reporting by an end user about an error, inaccuracy, or omission in the geographic data used by the navigation system or about some other problem of the navigation system. The feature can be used by the end user of a navigation system to report perceived errors in the geographic data, poor quality routes, confusing route guidance, and so on.

In order to provide the error reporting feature, the navigation system 110 includes a reporting program. Referring to FIG. 3, a reporting program 300 is shown included among the applications in the navigation programming 228. In one embodiment, the reporting program 300 includes a monitoring component 310 and a reporting component 320.

Figure 4:
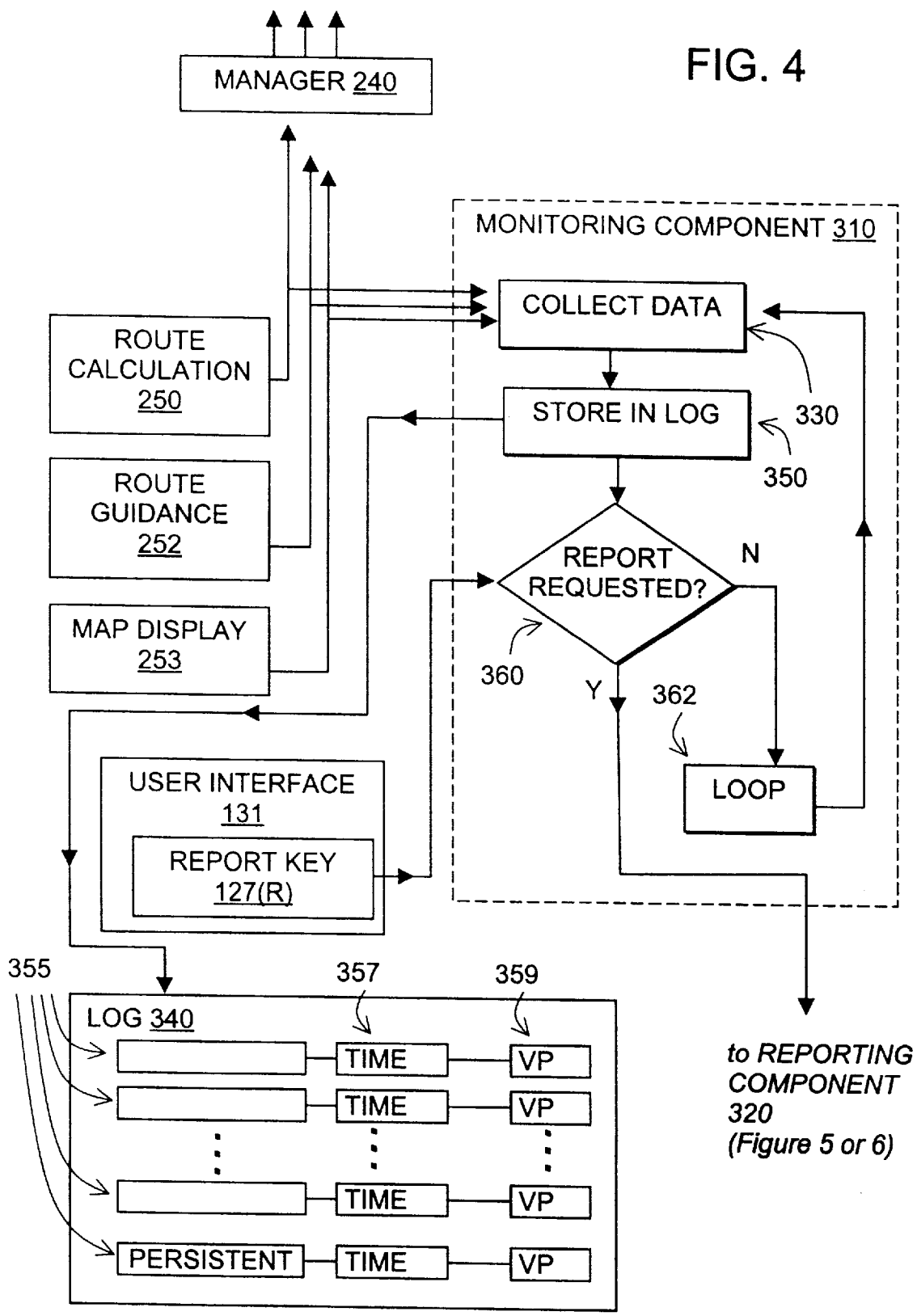
FIG. 4 is a flow chart of steps performed by the monitoring component of the error reporting program of FIG. 3.

The monitoring component 310 of the reporting program 300 is a software program or routine that monitors the operation of some of the navigation applications 228. The monitoring component 310 may operate continuously in the background while the navigation system is being used. FIG. 4 shows steps performed by the monitoring component 310. The monitoring component 310 receives data from some of the other applications (Step 330). In particular, the monitoring component 310 receives data indicating navigation-related information that is provided to the end user via the user interface 131. For example, if the route guidance application 252 provides a driving instruction to the end user via the user interface 131, the monitoring component 310 receives data that indicates the driving instruction. The monitoring component 310 may receive a copy of the same data sent from the route guidance application 252 to the user interface 131 or alternatively, the monitoring component 310 may receive an abridged or compressed version of the data. According to another example, if the map display application 253 provides data for a map image that is displayed to the end user on the display screen 129(D) of the user interface 131, the monitoring component 310 receives data indicating the map image.

As these data are received from the various navigation applications, the monitoring component 310 maintains a log 340 of the most recent navigation-related information that had been provided to the end user (Step 350). The log 340 may be maintained in a buffer memory that is part of the RAM (120 in FIG. 1) of the navigation system 110. The monitoring component 310 makes an entry 355 in the log 340 for each item of navigation-related information that is provided to the end user. As an example, if a maneuvering instruction, such as "TURN LEFT AT THE NEXT INTERSECTION" had been provided to the end user, the monitoring component 310 would include a data entry 355 in the log 340 indicating that the end user had been provided with route guidance and the specific guidance (i.e., "TURN LEFT AT THE NEXT INTERSECTION")that had been provided. As another example, if a map image had been provided to the end user on the display screen 129(D), the monitoring component 310 would include a data entry 355 indicating that the end user had been provided with a map and the data indicating the specific map that had been provided.

The monitoring component 310 associates a time stamp 357 with each entry 355. The time stamp 357 indicates the time that the associated guidance was provided to the end user. Also, the monitoring component 310 may associate with each entry 355 data 359 indicating the vehicle's position when the navigation-related information was provided by the navigation system to the end user. The data 359 indicating the vehicle's position are obtained from the vehicle positioning application 256 (in FIG. 3).

As the navigation system continues to provide new navigation information to the end user, the monitoring component 310 adds new entries 355 to the log 340. According to one embodiment, the monitoring component 310 performs a clean up function with respect to the log 340. As the navigation system provides new navigation information to the end user, the monitoring component 310 replaces the oldest entries in the log 340 with new entries, i.e., first-in-first-out. For example, as new maneuvering instructions are provided by the navigation system, entries are added to the log indicating these maneuvering instructions. Entries in the log indicating maneuvering instructions that had been previously provided, e.g., several minutes ago, are discarded. Therefore, the log maintains at least the navigation-related information that had been provided to the end user most recently, i.e., over the previous several minutes.

An exception to the first-in-first-out maintenance of the log applies to persistently provided navigation information. Persistently provided navigation information includes information that continues to be provided by the navigation system over a relatively long period of time. A map image on the display 129(D) is an example of persistently provided navigation information. The same map image may be shown on the display screen for several seconds or even for several minutes. During the time when the same map image was being displayed, the navigation system may have provided the end user with several maneuvering instructions. The monitoring component 310 maintains the entry for persistently provided navigation information, such as a map image being displayed, in the log 340 for so long as the information is still being provided to the end user. When the persistently provided information is no longer being provided to the end user, the log entry for the information may be discarded and replaced with entries for other newly provided navigation information.

The monitoring component 310 checks whether the end user has requested that a report be made (Step 360). The end user may request that a report be made by pressing the report key or button (127(R) in FIG. 2) or by other appropriate input into the user interface. If the end user has not requested that a report be made, the monitoring component 310 continues to collect data indicating the navigation information being provided to the end user and storing the navigation information in the log (Step 362).

At any time while the navigation system is operating, the end user may perceive an apparent error or inaccuracy in the geographic data used in the navigation system. The perceived error or inaccuracy can be of any type and may be encountered in various different ways. For example, while being guided to follow a route to a destination, the navigation system may provide the end user with incorrect, inaccurate or confusing guidance. According to this example, the navigation system may advise the end user to "TURN LEFT AT THE NEXT INTERSECTION" but the next intersection has a sign that prohibits left turns. According to another example, the navigation system may identify a street by a wrong name.

There are various reasons why a navigation system may provide incorrect, inaccurate or confusing information to an end user. One possible cause is that the geographic data used by the navigation system may be incorrect. The geographic data may be incorrect because of an error made when the data were being collected. Alternatively, the geographic data used by the navigation system may be incorrect because the physical feature represented by the geographic data changed since the time the geographic data used by the end user's system was collected.

Another possible cause for an end user receiving incorrect, inaccurate or confusing guidance from a navigation system can be an error in the software programming in the navigation system. In this case, the geographic data may be correct but the end user receives incorrect, inaccurate or confusing guidance because the software programming the navigation system does not use the geographic data properly. For example, if the navigation system software determines a vehicle's position incorrectly, a wrong street name may be provided thereby giving the end user the impression that the geographic data are incorrect when in fact the navigation programming caused the error.

Another reason why a navigation system may provide incorrect or confusing guidance is that the geographic data used by the navigation system may not include the attributes that are necessary to provide better instructions. For instance, the data representing roads located in some geographic areas may not contain one-way information because one-way street information has not yet been collected for those areas. Alternatively, the software programming in the navigation system may not consider one-way streets when providing driving directions.

Regardless of the cause of a perceived error, when the end user perceives an apparent error, he/she can use the reporting program 300 to make a report about the perceived error. The reporting program 300 facilitates the reporting of the perceived error by automatically performing some or all the steps that are needed in order to make the report meaningful to the database developer and sending the report to the database developer.

In order to use the reporting program to report a perceived error, the end user starts operation of the error reporting component 320 of the reporting program 300. As mentioned above in connection with FIG. 3, the error reporting component 320 is part of the reporting program 300. The end user starts operation of the error reporting component 320 of the reporting program 300 by appropriate operation of the user interface 131. According to one embodiment shown in FIG. 2, the user interface 131 may include a dedicated error reporting button or key (e.g., error button 127(R) in FIG. 2). The end user operates the dedicated error reporting button 127(R) to start operation of the error reporting component 320 to report a perceived error. (In an alternative embodiment, instead of a dedicated error reporting button, the navigation system 110 may provide for starting the error reporting component 320 by using the keypad 127(P) or microphone 127(M). To assist in using the keypad 127(P) or microphone 127(M) to operate the reporting program, a menu or prompts may be provided on the display 129(D) or speakers 129(S).)

Referring to FIG. 4, the monitoring component 310 checks whether the end user has pressed the error reporting button 127(R) or otherwise has operated the user interface 131 to indicate that he/she desires to report an error (Step 360). When the monitoring component 310 detects user input indicating that an error report is desired, the monitoring component 310 calls the error reporting component 320.

Figure 5:
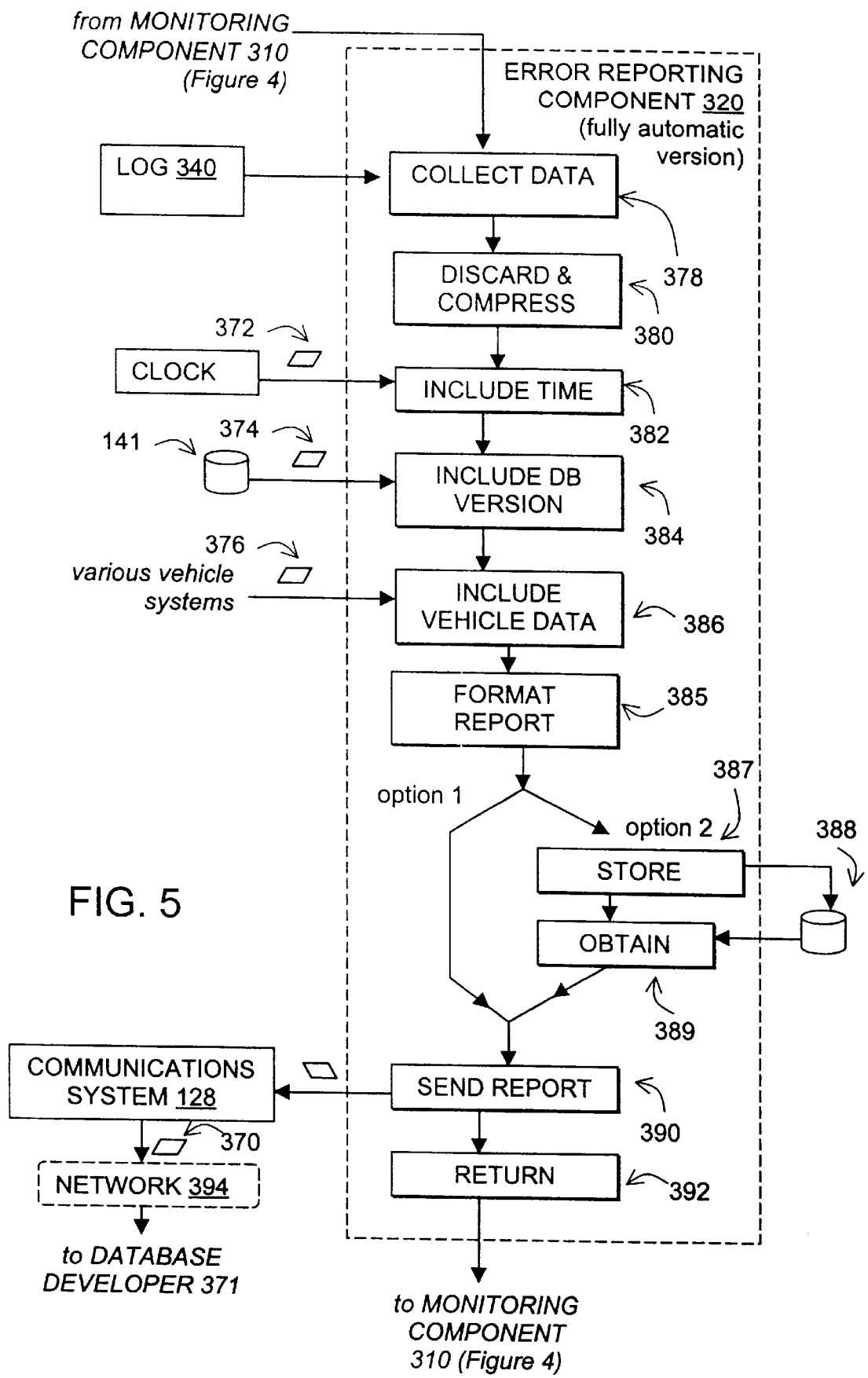
FIG. 5 is a flow chart of steps performed by the reporting component of the error reporting program of FIG. 3.

The error reporting component 320 performs all or some of the steps involved in forming and sending a report about a perceived error. The error reporting component 320 may form and send the report fully automatically or alternatively, the error reporting program 320 may provide an error report that includes input from the end user. FIG. 5 shows some of the steps performed by the error reporting component 320 to form and send an error report 370. The embodiment of the error reporting component 320 in FIG. 5 forms the error report fully automatically, i.e., without input from the end user.

In FIG. 5, the error reporting component 320 includes a step that obtains the data indicating the recently provided navigation guidance from the log 340 (Step 378). The error reporting component 320 may discard some of the data (Step 380). For example, if some of the data from the log 340 are relatively old or are redundant, these data may be discarded. The error reporting component may also compress the data from the log 340, if appropriate. The error reporting component 320 includes data 372 in the report 370 that indicates the time the error reporting routine was started (Step 382). The error reporting component 320 also includes data 374 identifying the version, release, and coverage area of the geographic database (141 in FIG. 1) used by the navigation system (Step 384). Optionally, the error reporting component 320 also includes vehicle data 376 (Step 386). The vehicle data 376 may include the vehicle speed, direction, whether the vehicle was currently on a route calculated by the navigation system, and so on. The vehicle data 376 may be obtained from various vehicle sensors (such as the sensors 125 in FIG. 1) or alternatively from the navigation applications in the programming 228 that use some of the same vehicle data.

When all these items of information are collected, the information is organized in a format suitable for the report (Step 385). In one embodiment, the report 370 is organized in a standardized format, such as WML (Wireless Markup Language), WAP (Wireless Application Protocol), or XML (Extensible Markup Language). This would allow reports that are prepared on various different navigation system hardware platforms be collected and used without the need for data conversion. After the report is prepared, the error reporting component 320 either sends the report 370 immediately to a geographic database developer 371 (option 1) or alternatively, the error reporting component 320 stores the report and then sends the report to the geographic database developer 371 (option 2). If the error reporting component 320 sends the report immediately, the report 370 is forwarded to the communications system 128 of the navigation system 110 and the communications system 128 is used to send the report 370 to the geographic database developer (Step 390). If the error reporting component 320 stores the report 370 first, the report 370 is stored on a medium 388 in the vehicle 111 (Step 387). The report 370 may be stored with other reports on the medium 388. At a later time, the report 370 is obtained from the medium 388 (Step 389). If there are other reports stored on the medium 388, these other reports may also be obtained at this step. Then the report 370 is sent to the database developer 371 (Step 390).

When sending the report 370 to the geographic database developer 371 using the communications system 128, it is understood that the report 370 may be sent over various communications systems, carriers or networks 394. For example, the report 370 may be sent via a wireless communications system from the vehicle 111 to a land-based receiver and then the report may travel over land-based communications systems or the Internet to the geographic database developer.

After the error reporting component 320 has sent the report 370 to the geographic database developer, the error reporting component 320 returns to the monitoring component 310 (Step 392). At this point, the end user may be sent a message thanking him/her for submitting the report.

Figure 6:
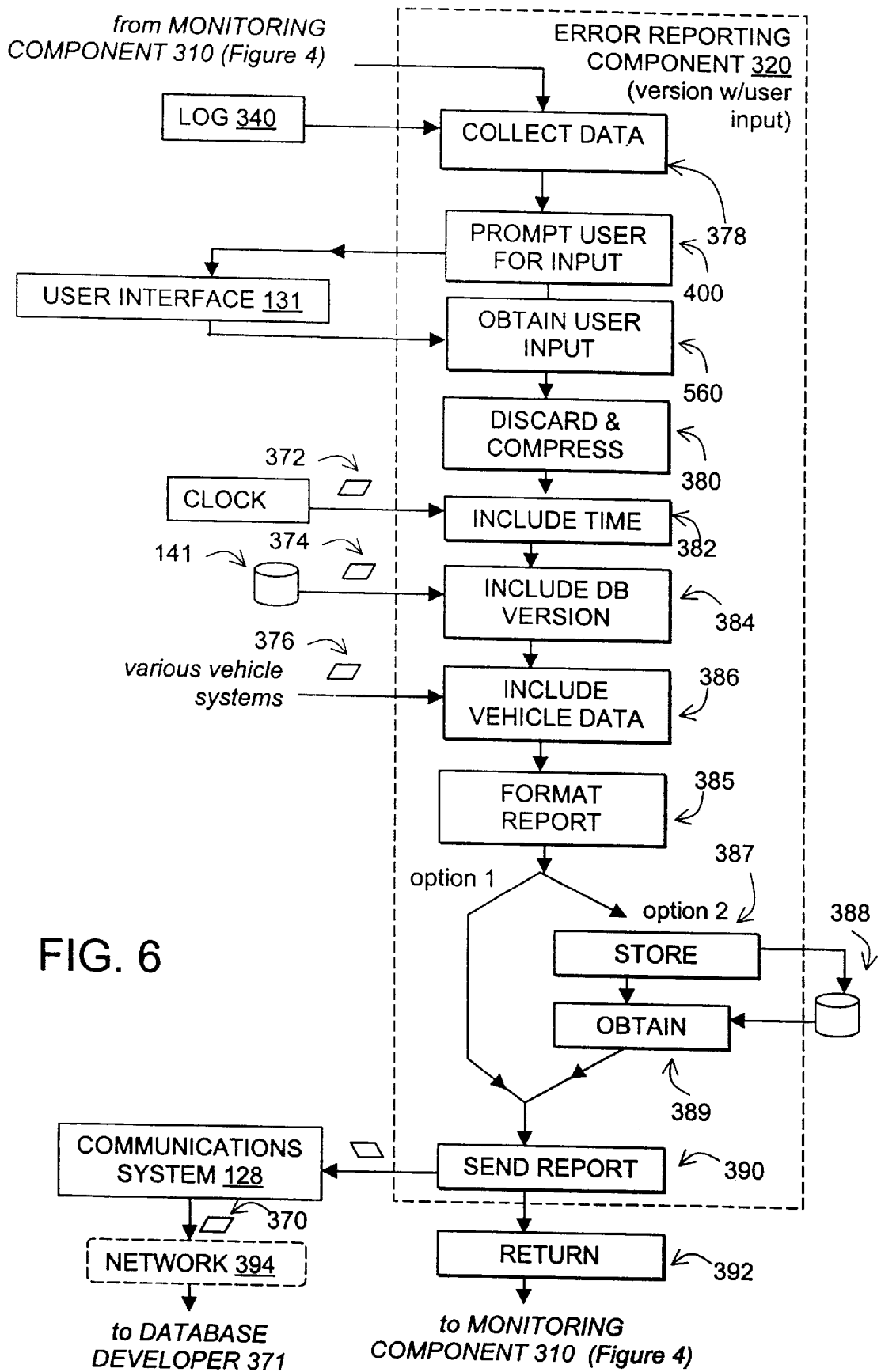
FIG. 6 is a flow chart of steps performed by another embodiment of the reporting component of the error reporting program of FIG. 3.

As stated above, in an alternative embodiment, the error reporting program 320 may provide an error report that includes input from the end user. FIG. 6 shows some of the steps performed by the error reporting component 320 to provide a report that includes user input. The embodiment of the error reporting component that includes user input performs some of the same steps as the embodiment of the error reporting component that automatically prepares and sends a report without user input. Accordingly, FIG. 6 includes some of the same steps shown in FIG. 5.

Figure 7:
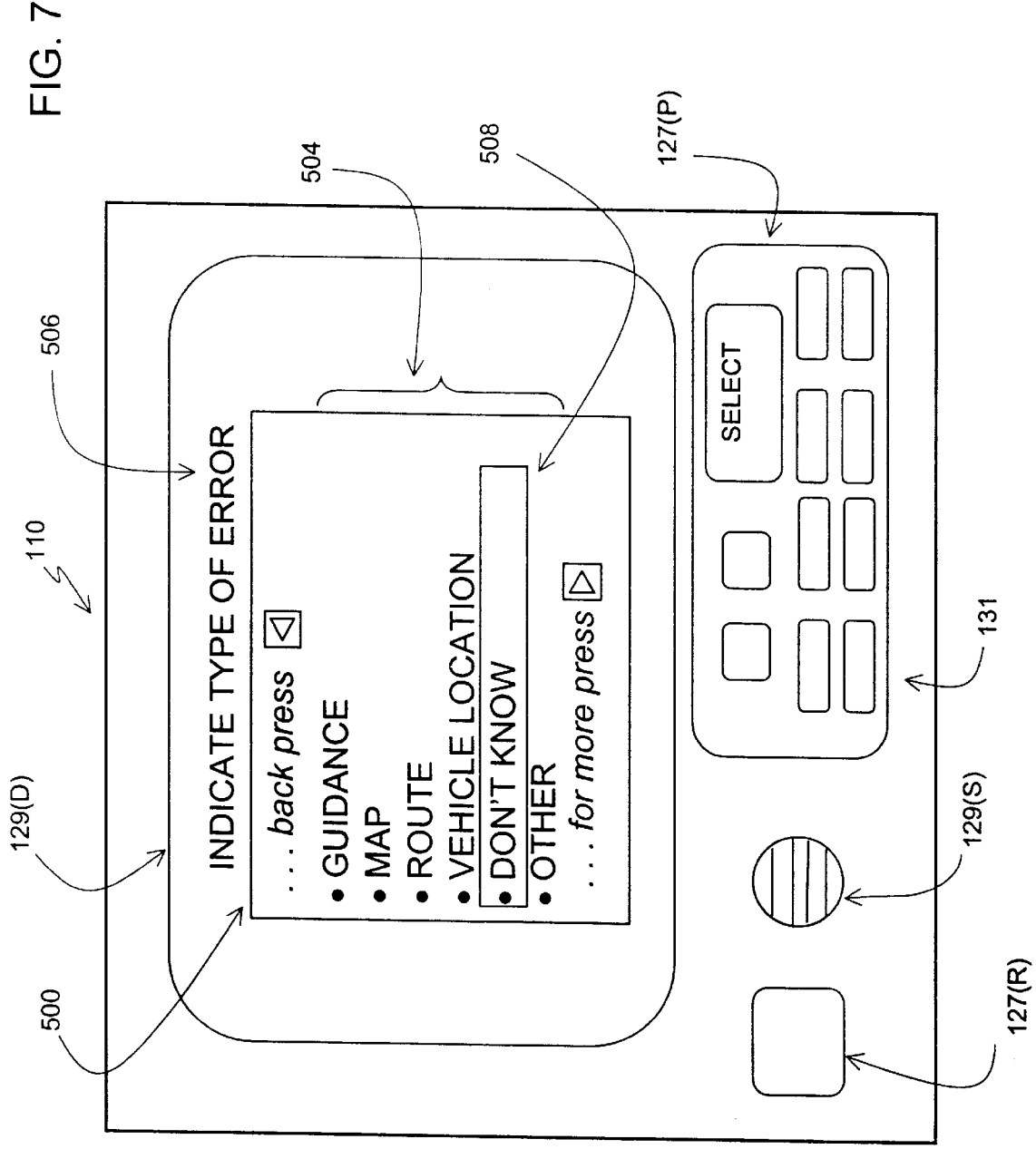
FIG. 7 illustrates a display screen of the navigation system at one step of the process shown in FIG. 6.

As shown in FIG. 6, after the step (i.e., Step 378) in which data are collected from the log 340, the error reporting component 320 requests input from the end user for forming the error report (Step 400). The input requested by the error reporting component 320 allows the end user to specify the perceived error. When requesting this input from the end user, the error reporting component 320 may present the end user with a menu on the display screen 129(D) or may request input audibly. FIG. 7 shows a menu 500 on the display screen 129(D) of the user interface of the navigation system for requesting input from the end user for specifying the type of perceived error to be reported. The menu 500 includes a list of choices 504 from which the end user can select one. In the embodiment of FIG. 7, the choices 504 indicate different types of information that had been provided to the end user. The error reporting component 320 presents the end user with a message 506 requesting the end user to make a selection. The end user is provided with a way to select one of the choices. For example, a selection box 508 may be moved from one choice to another. When the selection box 508 is located on the menu item desired by the end user, the end user can press a key, or operate another appropriate component of the user interface, to indicate the selection.

Figure 8:
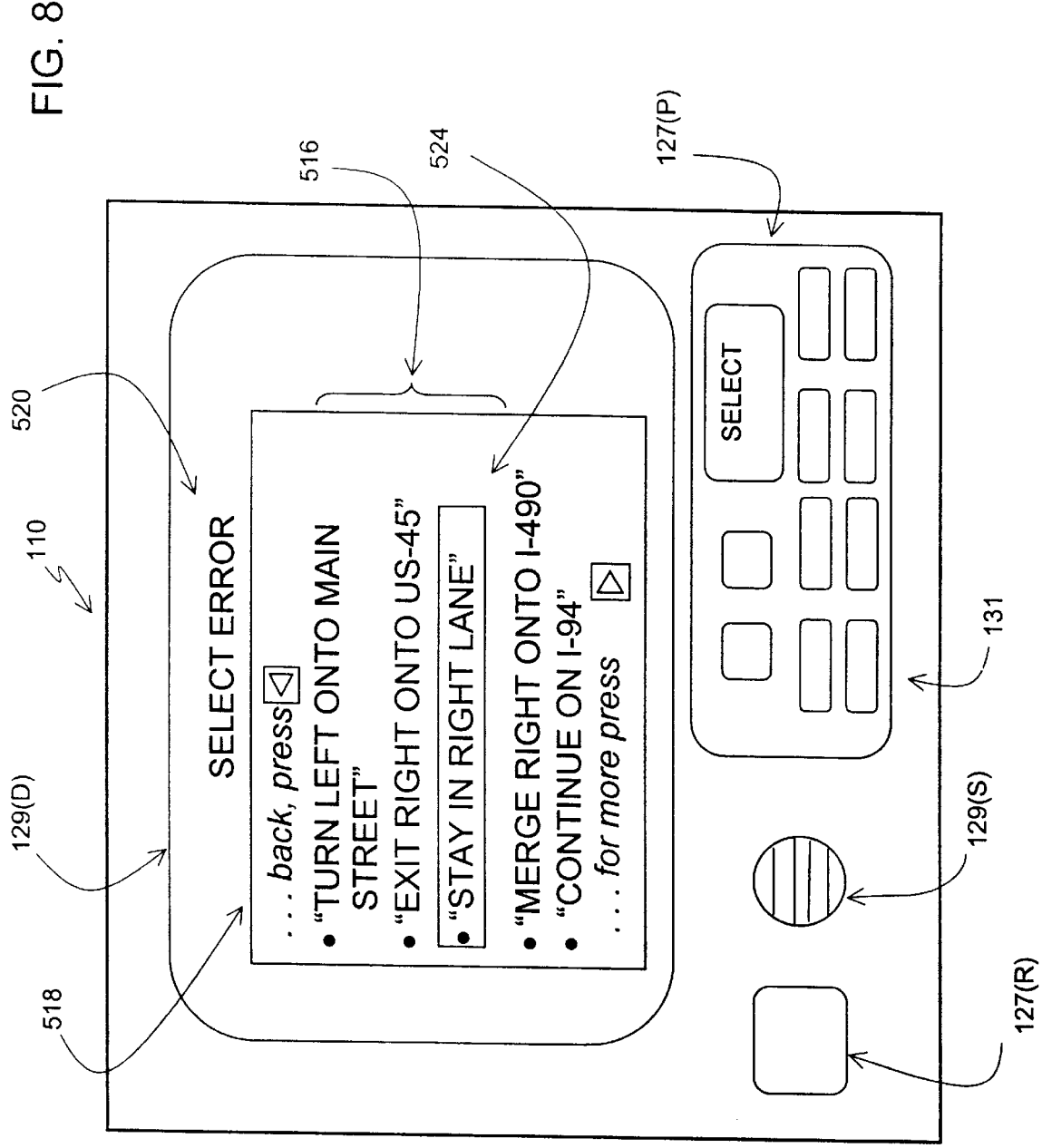
FIG. 8 illustrates the display screen of the navigation system showing a way to indicate an error according to the process of FIG. 6.

The error reporting component 320 may include a hierarchy of menus or display screens so that selection of one of the items on one menu will cause another menu or screen to be presented. For example, if the end user selects "GUIDANCE" from the menu 500, the end user is presented with another screen that shows the most recently provided items of route guidance. FIG. 8 shows an example of a display screen 518 with a list 516 of the most recently provided items of route guidance. The list 516 of recently provided items of route guidance may be obtained from the log 340 which is obtained by the error reporting component 320 from the monitoring component 310 (at Step 378). The end user is provided with a message 520 requesting the end user to select one or more of these items. The end user is also provided with a means to indicate one or more of the items, e.g., a selection box 524.

In an alternative embodiment, the recently provided driving instructions can be provided to the end user audibly. According to this alternative embodiment, when the end user selects "GUIDANCE" from the menu 500 in FIG. 7, the most recently provided driving instruction is provided again to the end user along with a query asking "IS THIS THE GUIDANCE THAT CONTAINS AN ERROR?" This query may be provided audibly with the most recently provided driving instruction or the query may be provided on the display screen 129(D).

Figure 9:
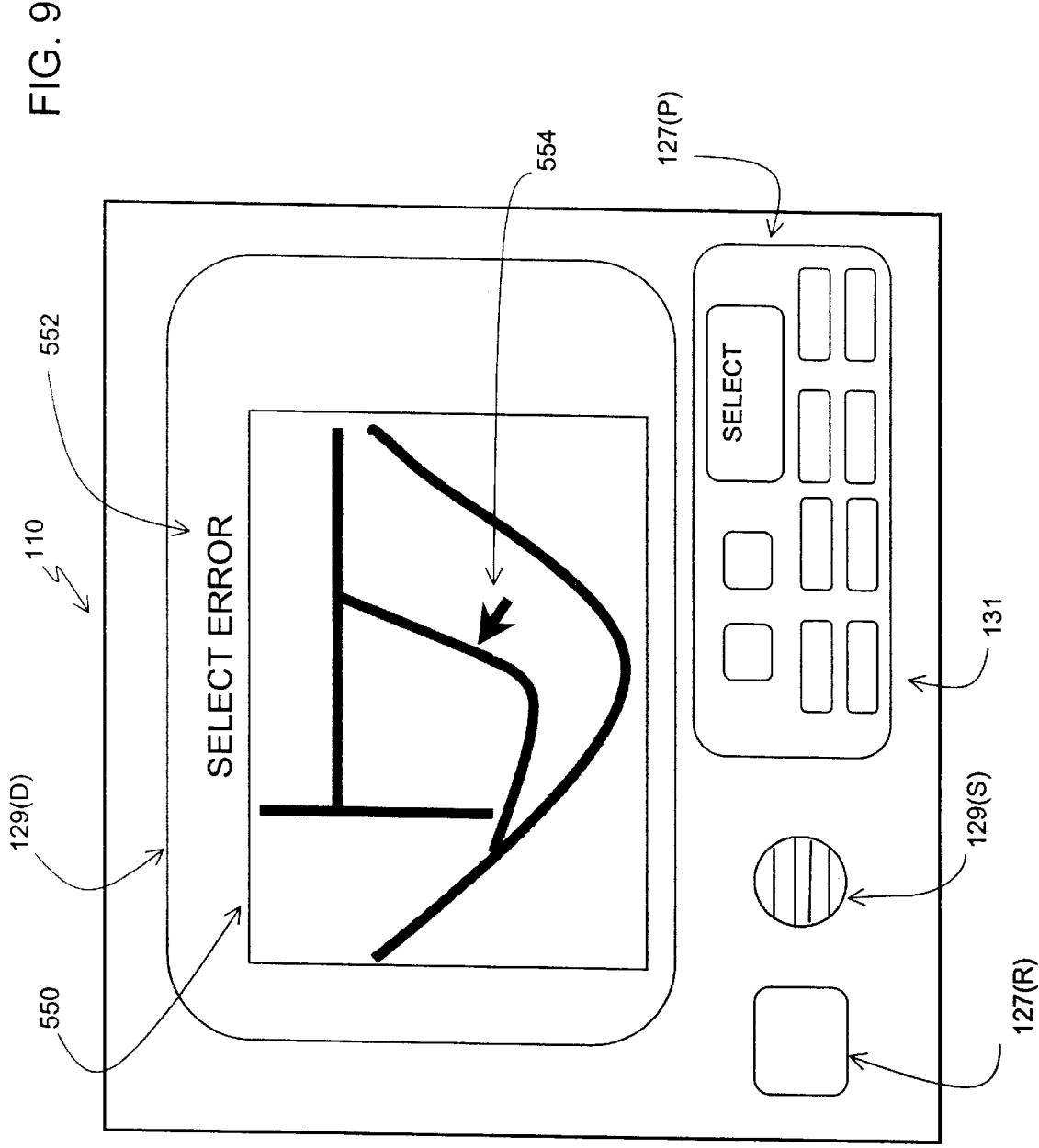
FIG. 9 illustrates the display screen of the navigation system showing an alternative way to indicate an error according to the process of FIG. 6.

Referring again to FIG. 7, if the end user selected "MAP" from the menu 500, the error reporting component 320 presents a display of the most recently provided map image. The reporting component 320 also provides the end user with a means to select a feature displayed on the map image or a portion of map image. For example, the end user may be provided with a way to highlight a feature on the map image by using a pointing device (e.g., on the input panel 127(P)). Alternatively, the end user may be provided with a way to select an area of the map by drawing a box or circle. FIG. 9 shows an example of a map display 550 provided by the error reporting component 320, including a message 552 prompting the end user to select a feature by pointing to it with a cursor or arrow 554.

Figure 10:
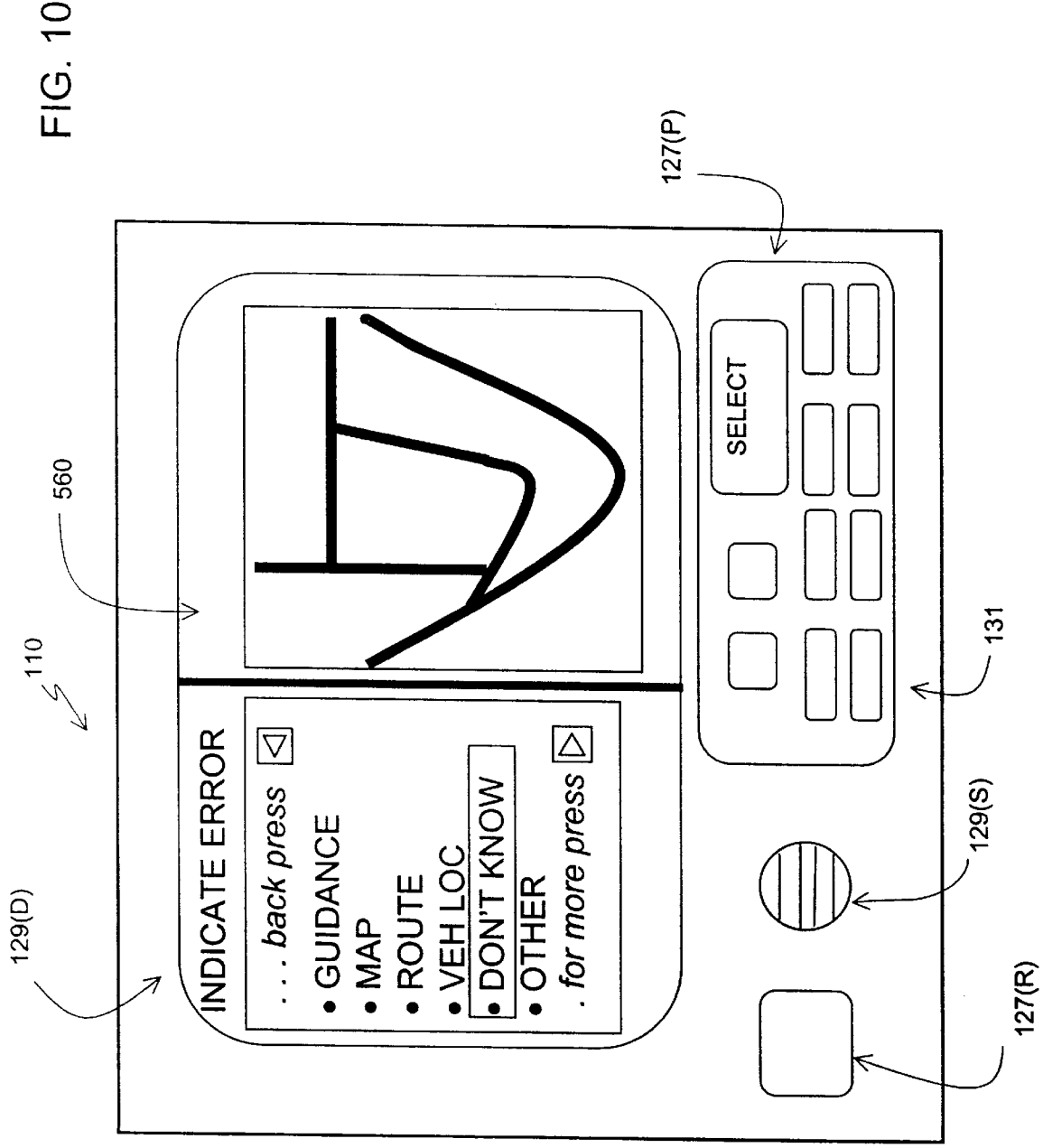
FIG. 10 illustrates the display screen of the navigation system showing an alternative embodiment in which the error reporting process occupies one window and the normal route guidance process occupies another window.

According to another alternative embodiment, when the end user is provided with menus, maps, or messages on the display screen 129(D) as part of the error reporting process, the display screen may be divided into two (or more) windows or parts. The menus, maps, or messages provided as part of the error reporting process may occupy one of the windows. Another of the windows is used to continue providing the appropriate map, graphic, or route guidance for following the route. An example of the multiple pane display screen 560 is shown in FIG. 10.

According to still another alternative embodiment, the end user may provide a spoken comment when prompted to do so by the error reporting component 320. The spoken comment may be provided as a substitute for, or in addition to, selections made by the end user using the menus, maps, or messages on the display screen 129(D).

Referring again to FIG. 6, the error reporting component 320 obtains the end user's input in response to the menus, prompts, and so on (Step 560). The end user's input is included in the report 370 that is prepared by the error reporting component 320. The end user's input may be used (in Step 380) to discard information from the report that is not relevant. For example, if the end user indicated that the route guidance included an error, the map information from the log 340 may be omitted from the error report 370 that is prepared by the error reporting component 320.

The error reporting component 320 that includes user input then performs the same steps described above as the error reporting component 320 that does not include user input. Specifically, the error reporting component 320 may include a time stamp (Step 382), data indicating a database version, release and coverage area (Step 384), and vehicle data (Step 386). The error reporting component 320 formats the report (Step 385). Then, the error reporting component 320 sends the report 370 to the geographic database developer 371 immediately or stores the report first and later sends it to the geographic database developer 371.

Figure 11:
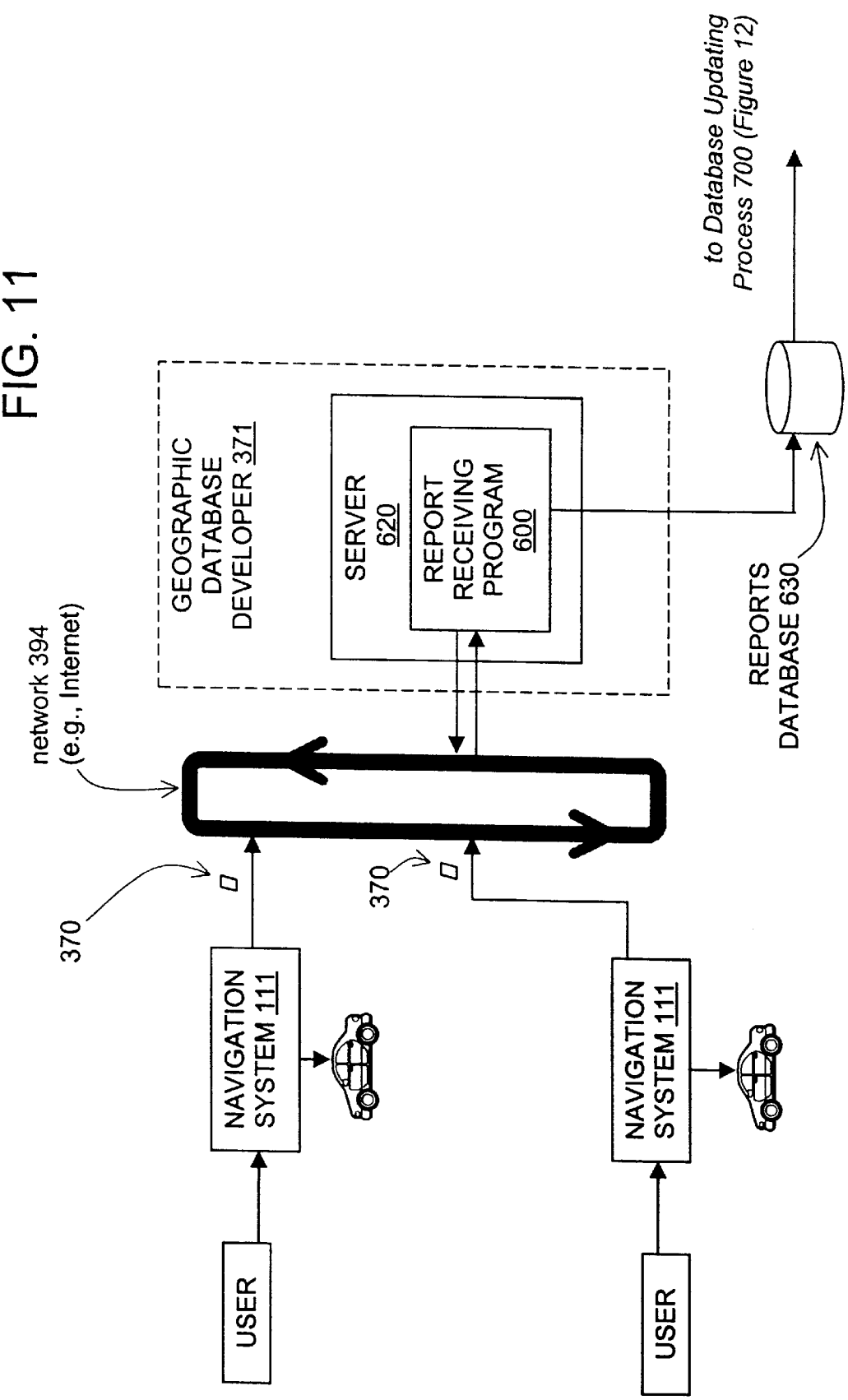
FIG. 11 is a diagram illustrating a process wherein error reports from navigation systems in multiple vehicles are sent to a geographic database developer.

Referring to FIG. 11, the reports 370 prepared by the error reporting programs 300 in end users' vehicles are sent over the network 394 to the database developer 371. The database developer 371 operates a report receiving program 600. The report receiving program 600 is located on a server 620 that is connected to the network 394. The database developer 371 stores the reports 370 received over the network 394 from the various users in a reports database 630.

Figure 12:
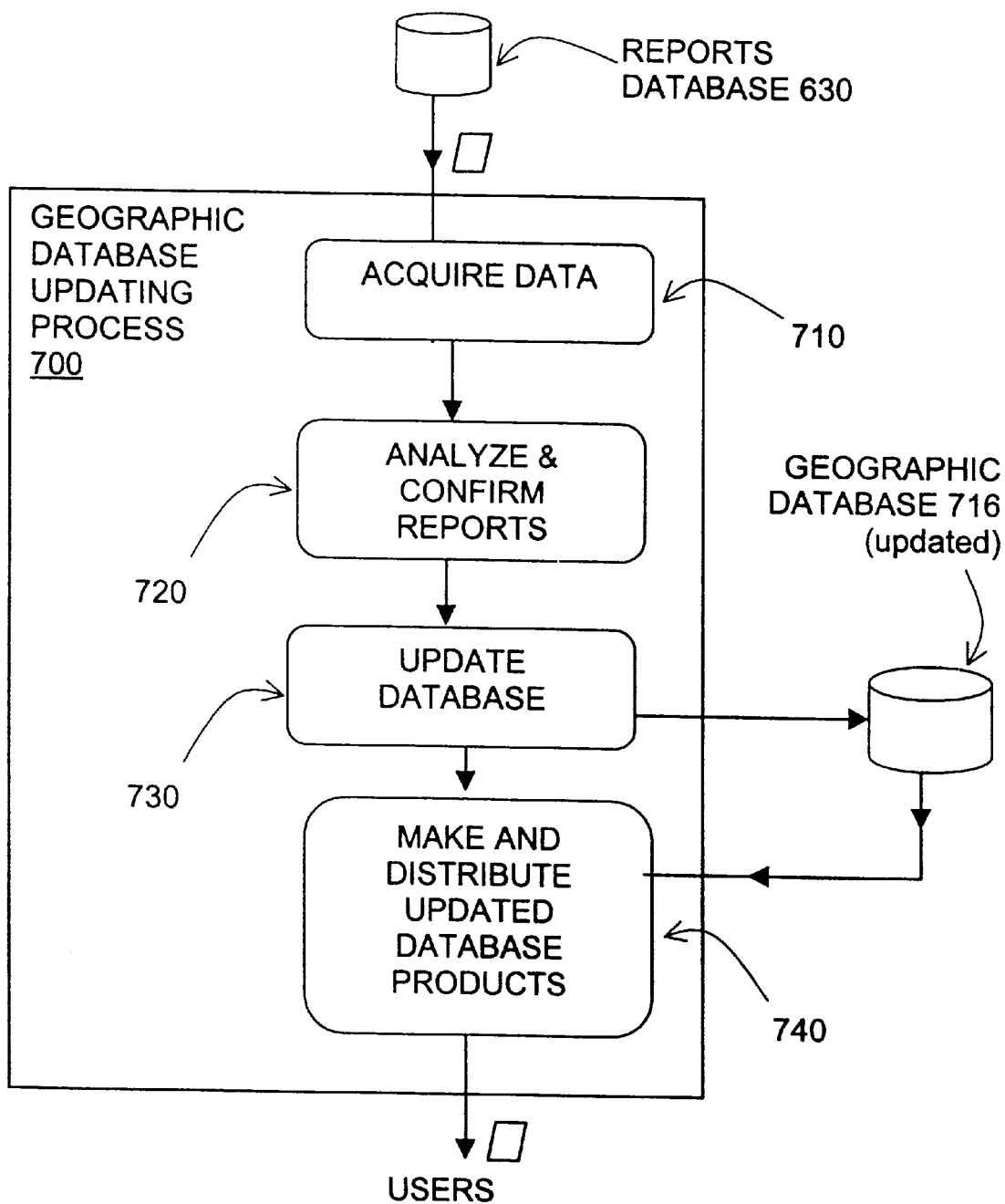
FIG. 12 is a flow chart showing steps performed by the geographic database developer to update a geographic database using the error reports received in FIG. 11.

Referring to FIG. 12, the data in the reports database 630 are used in a geographic database updating process 700. The geographic database updating process 700 may be performed by the geographic database developer 371.

According to one embodiment, the geographic database updating process 700 receives the data from the reports database 630 (Step 710). The reports in the reports database 630 are analyzed and/or confirmed (Step 720). Various kinds of analysis may be performed. For example, if a significant number of errors are reported for the same location, it may be taken as an indication that there may be errors associated with the data representing that location. Similarly, if a number of reports of poor quality vehicle positioning are reported for an area, it may be an indication that the data in the geographic database indicating the positions of the roads in that area are not correct. Further, if poor quality routes are reported for certain areas, it may an indication that the data indicating the road categories or speed limits of the roads in the area are incorrect.

The reports of certain kinds of errors may be confirmed by examining aerial photographs, by traveling out to the location represented by the data, or by other means. When an error is confirmed, the correct information is added to the geographic database, thereby forming an updated version 716 of the geographic database (Step 730). The end user who submitted the report concerning the error may be sent a message (e.g., by phone or email) informing him/her that the master copy of the geographic database has been corrected and updated. When the database 716 has been updated, derived database products reflecting the updated data are made and distributed to the end users (Step 740). The end users may be provided with an opportunity to obtain or purchase copies of the updated database.

III. ALTERNATIVES

In the embodiments described above, the error message was sent as a data message by the error reporting program to the geographic database developer. In an alternative embodiment, the end user can provide an error report vocally. According to this alternative embodiment, when the end user operates the user interface of the navigation system to report an error (e.g., by pressing the error reporting button 127(R) in FIG. 2), programming in the navigation system automatically makes a telephone call to an error report receiving service. The error report receiving service may be staffed with human operators who answer the telephone calls from the end users or alternatively, the error report receiving service may provide an answering machine interface. When the error report receiving service answers a telephone call made from the navigation system reporting an error, the end user provides information about the error. If the error reporting service includes a human operator, the human operator can obtain information from the end user about the error. Information about the database version does not have to be provided by the end user. Instead, when the navigation system automatically calls the error reporting service, the navigation system may identify itself by a code number and may also identify the version of the geographic database used by the navigation system. Alternatively, the error reporting service may maintain data records that indicate the database version associated with the particular navigation system. When the error reporting service obtains the information about the perceived error from the end user, the error reporting service sends a report to the geographic database developer who uses the report to update a geographic database as described in the previous embodiments.

In some of the embodiments described above, the geographic data were described as being stored on a medium located with the navigation system in a vehicle. In alternative embodiments, the geographic data do not have to be located in the vehicle. For example, the error reporting feature can be used with navigation systems in which the geographic data are located remotely, e.g., on a central server, and sent to the vehicle wirelessly. In alternative embodiments, the navigation programming or applications can also be located remotely. The error reporting feature can also be used with navigation systems in which the navigation programs or applications are located remotely.

IV. ADVANTAGES

One of the advantages of the disclosed embodiments is that end users can easily make reports about errors that they encounter while using their navigation systems.

Another advantage of the disclosed embodiments is that error reports are provided consistently.

Another advantage of the disclosed embodiments is that error reports from end users include sufficient detail so that the geographic database developer can determine the causes of the perceived errors.

Another advantage of the disclosed embodiments is that the end users are provided with an opportunity to be involved in the updating process. This involvement may help develop good will between the end users and the geographic database developer.

It is intended that the foregoing detailed description be regarded as illustrative rather than limiting and that it is understood that the following claims including all equivalents are intended to define the scope of the invention.

We claim:

1. A method of obtaining reports from end users about perceived errors encountered while using navigation systems installed in vehicles, the method comprising:

providing an error reporting feature accessible via a user interface of each of said navigation systems; and upon operation of the error reporting feature by one of the end users, receiving a vocal description of an error from the one of the end users.

2. The method of claim 1 wherein the vocal description is received by means of a telephone call initiated by the error reporting feature.

3. The method of claim 1 wherein the vocal description is received by an answering machine.

4. The method of claim 1 wherein the vocal description is received by a human operator.

5. The method of claim 1 further comprising:

receiving an identification of a database version in conjunction with said vocal description.

6. The method of claim 5 wherein the database version is provided by the error reporting feature.

7. The method of claim 5 wherein the database version is obtained from data records maintained by an error reporting service.

8. The method of claim 1 wherein the vocal description is received by an error reporting service.

9. The method of claim 8 wherein the error reporting service sends a report to a database developer.

10. The method of claim 9 wherein the database developer updates a geographic database using the report sent by the error reporting service.

11. The method of claim 1 wherein the vocal description relates to an error in geographic data used by the one of said navigation systems.

12. The method of claim 11 wherein the vocal description relates to an error in geographic data used by the navigation system operated by the one of said end users.

13. The method of claim 12 wherein the geographic data is stored on a medium located with the navigation system.

14. The method of claim 12 wherein the geographic data is obtained from a central server that is located remotely from the navigation system.

15. The method of claim 1 further comprising:

storing the vocal description in a log in the vehicle operated by the one of said end users.

16. The method of claim 15 further comprising:

storing a time stamp with the vocal description in the log.

17. The method of claim 15 further comprising:
sending a report that includes the vocal description to a geographic database developer.

18. A method of obtaining reports from end users about perceived errors encountered while using navigation systems installed in vehicles, the method comprising:
providing an error reporting feature accessible via a user interface of each of said navigation systems; and
operating an error reporting service that receives vocal descriptions of said perceived errors from the end users who operate the error reporting feature in each of said navigation systems.

19. The method of claim 18 further comprising:
receiving data accompanying said vocal descriptions, wherein said data indicate what information was being provided by said navigation systems when said errors were perceived.

20. A system for obtaining reports from end users about perceived errors encountered while using navigation systems installed in vehicles, the system comprising:
in each of said navigation systems, an error reporting feature accessible via a user interface thereof, wherein said error reporting feature receives input from an end user about a perceived error; and
an error reporting service that receives descriptions of errors from the end users who operate the error reporting feature in each of said navigation systems.

* * * * *